Nov. 10, 1970  C. VAN DER LELY  3,538,689
COMBINE HARVESTERS

Filed Sept. 14, 1967  5 Sheets-Sheet 1

INVENTOR
CORNELIS VAN DER LELY
BY
Mason, Mason & Albright
Attorneys

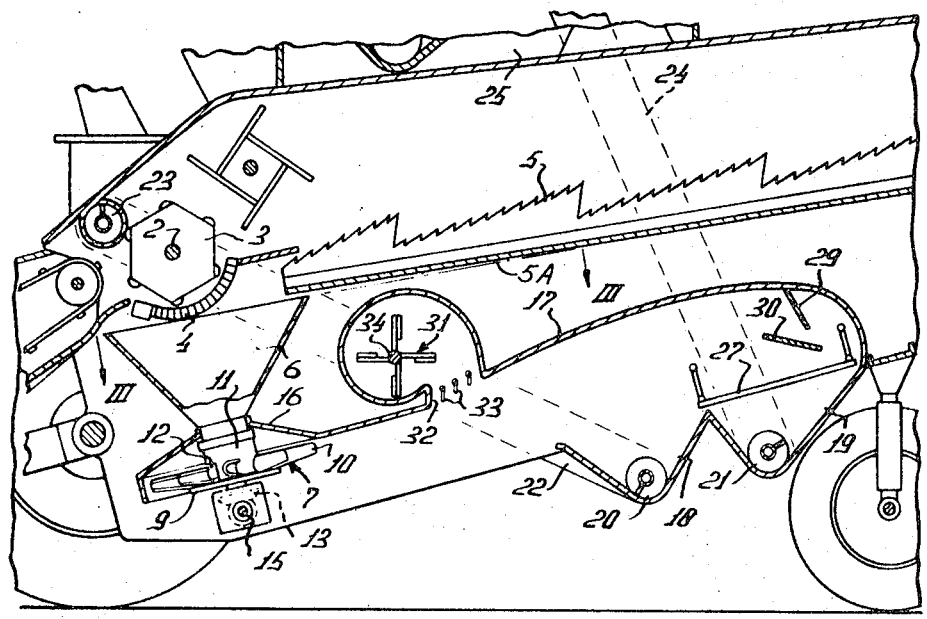

Nov. 10, 1970     C. VAN DER LELY     3,538,689
COMBINE HARVESTERS

Filed Sept. 14, 1967     5 Sheets-Sheet 3

INVENTOR
CORNELIS VAN DER LELY
BY
Mason, Mason & Albright
Attorneys

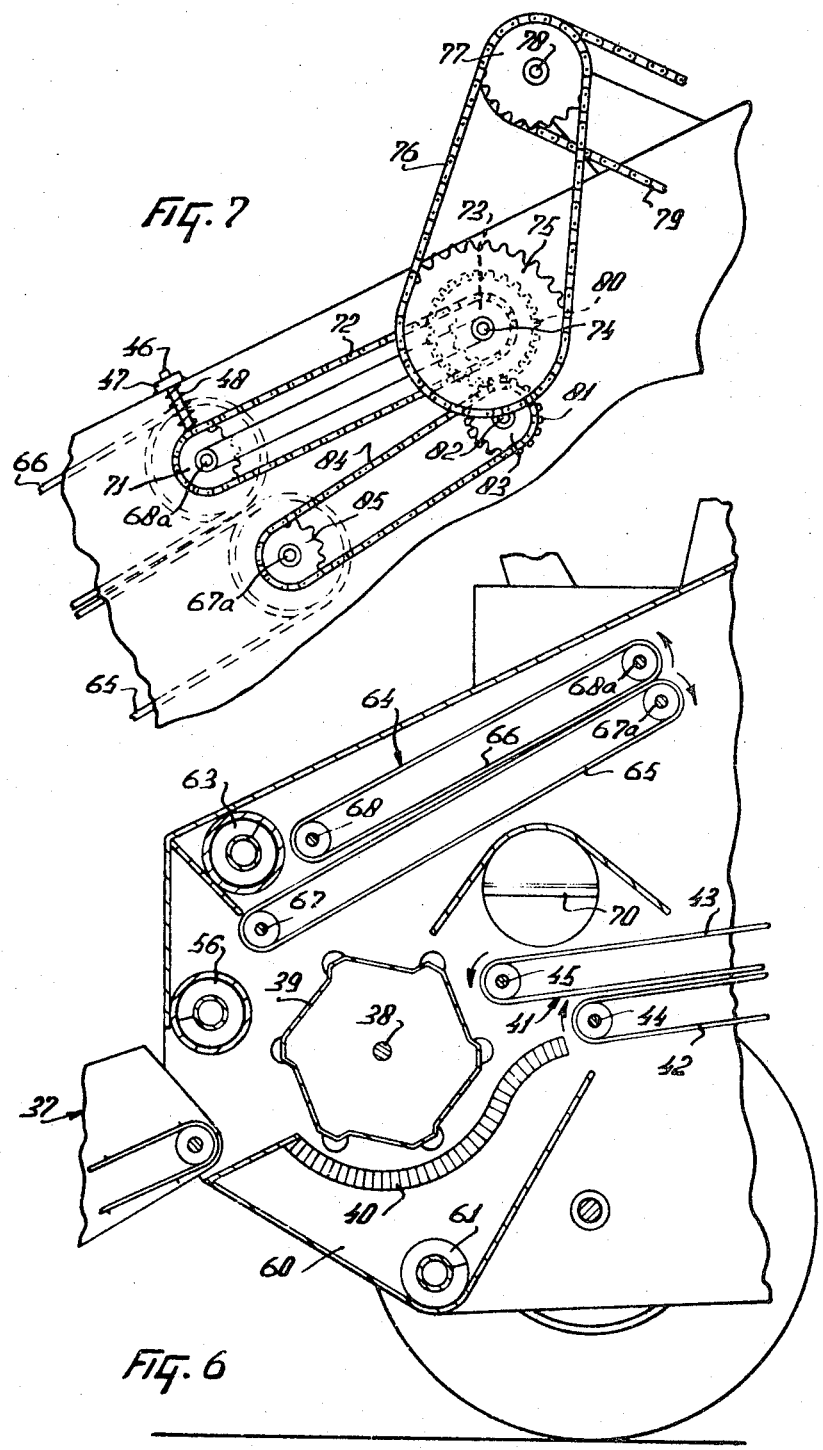

United States Patent Office 3,538,689
Patented Nov. 10, 1970

1

3,538,689
COMBINE HARVESTERS
Cornelis van der Lely, 7 Bruschenrain, Zug, Switzerland
Filed Sept. 14, 1967, Ser. No. 668,309
Claims priority, application Netherlands, Sept. 29, 1966,
6613707
Int. Cl. A01d 41/10; A01f 7/44
U.S. Cl. 56—21
17 Claims

ABSTRACT OF THE DISCLOSURE

A combine harvester having a mechanism for separating seeds from the other crop material whereby cut crop including the seeds after being threshed is thrown by an ejector to receiving areas disposed within the combine, the nature of the seeds being such that they are thrown farther and thus received in the most removed receiving area; a closer receiving area largely receiving the crop material other than seeds is conveyed back to the ejector to be thrown a second time so that seeds which may have been received in the closer receiving area have another opportunity to be separated into the farther receiving area. Air is selectively blown across the path of the thrown material. The farther receiving area may have a conveyor leading therefrom to a storage area on the combine for the storage of the seeds. The ejectors may comprise rotating discs, rotating rollers or rotating belts, the latter having the belt on the under side rotating at a speed greater than that of the upper belt.

SUMMARY OF THE INVENTION

This invention relates to combine harvesters.

According to one aspect of the present invention there is provided a combine harvester having a mechanism for separating seeds from other crop parts and the like, this mechanism comprising an ejecting device for throwing the material to be separated so that owing to differences in weight or shape or both the seeds are separated from the further crop parts; there being disposed at a distance from the ejecting device, means for the separate delivery of at least one of the separated products. With this construction even large quantities of material and weeds can be rapidly dealt with without decreasing the ratio of separation. Further the material can be spread out more evenly.

According to another aspect of the present invention there is provided a method of separating seeds from other crop parts and the like, intended for use in a combine harvester, wherein the threshed material is thrown on one side by means of an ejecting device into a space, while during the movement of the material a separation between seeds and other crop parts is performed under the action of differences in weight or shape or both, the seeds being conducted away on the other side of the space.

For a better understanding of the invention and to show how the same may be carried into effect, reference will now be made, by way of example, to the accompanying drawings, in which:

2

BRIEF DESCRIPTION OF THE DRAWINGS

FIG. 2 is a sectional side view on an enlarged scale of threshing, separating and cleaning mechanism of the thresher of FIG. 1, FIG. 3 is a sectional plan view taken on the line III—III of FIG. 2 of part of the mechanism of FIG. 2, FIG. 6 is a sectional side view on an enlarged scale of threshing, separating and cleaning mechanism of the thresher of FIGS. 4 and 5, FIG. 7 is a side view of the drive of an ejecting conveyor of the thresher of FIGS. 4 to 6.

DESCRIPTION OF THE PREFERRED EMBODIMENTS

Figure 1:
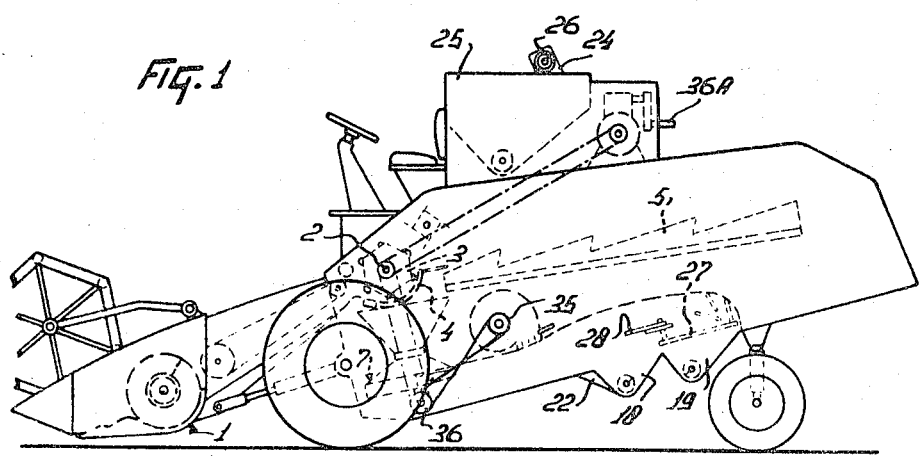
FIG. 1 is a diagrammatic side view of a first form of harvester thresher.

The harvester thresher shown in FIGS. 1 to 3 is provided with a moving platform 1. The threshing mechanism of the thresher includes a threshing drum 3 rotatable about a rotary shaft 2 journalled in the frame and extending transversely of the longitudinal center line of the thresher. The threshing drum 3 cooperates with a threshing jacket 4 disposed beneath the threshing drum 3. To the rear of the threshing mechanism with respect to the direction of operative travel a shaker 5 is disposed.

Beneath the threshing jacket 4 and in front of the shaker 5 two funnel-shaped supply members 6 are disposed side by side, each opening out above an ejector 7. Each ejector 7 is rotatable about a shaft 8 journalled is the frame of the machine and disposed, at an angle both to the horizontal and to the vertical. Each shaft 8, which is disposed near the center of its associated funnel-shaped supply member 6, is located in a vertical plane extending parallel to the longitudinal center line of the harvester and occupying a slightly sloping position in the forward direction so that it is at an acute angle to the horizontal plane with respect to the front of the harvester.

Each ejector 7 consists of a slightly dished disc 9 which carries curved blades 10 on its upper face, the blades 10 extending from the center of the disc 9 out to beyond the circumference thereof. On the lower end of each funnel-shaped supply member 6 there is provided a closing member 11 by means of which delivery of material from each of the funnel-shaped supply members 6 to the ejector 7 can be regulated. The closing member 11 has an opening 12 which can be closed and through which the material can be supplied to the disc 9 at the front with respect to the operative direction of travel of the implement. Although this is not shown in detail in the figures, the member 11 may be constructed in known manner such as is shown in U.S. Pats. Nos. 3,025,068 and 3,041,076, for example, whereby the zone of supply of material to the disc 9 can be varied, while, in addition, the size of the opening 12 can be varied.

Each of the shafts 8, about which the ejectors 7 are rotatable, is provided with a bevel gear wheel 13 which cooperates with a bevel gear wheel 14 on a shaft 15 extending transversely of the implement's operative direction of travel and having one end projecting from the body of the harvester.

Above each of the ejectors 7 a protecting ring 16 formed integrally with a screen 17 joins the lower end of the funnel-shaped supply member 6 that is above the ejector. The screen 17 extends rearwardly to the vicinity of the rear wheels of the harvester. Towards the rear the screen 17 extends in arcuate shape throughout the width of the harvester, so that together with the upright walls of the harvester, a hood is formed which extends from the ejectors 7 to the rear wheels of the harvester, this hood being open at the bottom.

Two delivery spaces 18, 19 are located, at a distance from the ejecting device formed by the ejectors 7, at the rear end of the hood beneath the arcuate portion of the screen 17. The screen 17 terminates at the rear wall of the delivery space 19. The delivery spaces 18 and 19 have the shapes of troughs and have disposed in their bases worm conveyors 20 and 21 respectively. The worm conveyor 20 joins an elevator 22, the other end of which joins a dividing auger 23 located in front of the threshing drum 3. The worm conveyor 21 joins a further elevator 24 which communicates with a dividing auger 26 located above a grain tank 25.

Above the rearmost delivery space 19 there is disposed a reciprocal sieve 27, the mesh size of which can be modified in known manner by means of an adjusting member 28 disposed outside the body of the harvester. Above the sieve 27 arresting boards of elastic material 29 and 30 are disposed.

At a distance behind the ejecting device, at the front end of the arcuate portion of the screen 17, a fan 31 mounted on a shaft 34 is disposed above the screen. This fan cooperates with an outlet 32 in which blades 33 are disposed. The blades 33 may be adjusted in known manner for changing the intensity and the direction of the flow of air produced by the fan. The ejectors 7 and the fan shaft 34 are driven in a conventional manner by the engine of the harvester thresher. The shafts 34 and 15 are provided for this purpose at their ends projecting from the body of the harvester with pulleys 35 and 36 respectively. Not only the drive of the ejectors 7 but also that of the fan 31 includes a continuous speed-changing member (not shown). The engine driving the harvester thresher has a rearwardly projecting outlet 36A.

The thresher or combine harvester described above operates as follows:

In operation the crop mown by the knife of the mowing platform 1 is conveyed towards the threshing mechanism. The crop passed in between the threshing drum 3 and the threshing jacket 4 of the threshing mechanism is thrown onto the shaker 5 located behind the threshing drum. The threshed product and the product still incompletely threshed is thus separated from the straw, which is thrown out of the machine to the rear. The threshed product and the still incompletely threshed product falling through the threshing jacket 4, together with the threshed product and the still incompletely threshed product supplied from delivery gutters 5A of the shaker 5, pass to the supply members 6, disposed beneath the threshing mechanism. By means of the closing member 11 the material is conveyed in front of the shafts 8 to the discs 9. The blades 10, which rotate in opposite directions indicated by the arrows A, throw the material along the ring 16 and screen 17 and the sidewalls of the harvester to the rear. Owing to the slightly dished form of the discs 9 the material moves obliquely upwards away from the ejectors 7. During the passage of the material ejected by the rotating discs 9 through the hood formed by the members 16 and 17 and the side-walls of the harvester towards the delivery spaces 18, 19 at the rear side of the hood the threshed product is separated from the incompletely threshed product and from the further crop parts by differences in weight or shape or both. The lowermost product, formed by the seeds, moves further along the hood than the further crop parts formed by partly full ears, chaff and tailings. The chaff and the tailings drop out of the harvester, this being aided by the flow of air produced by the fan 31 and directed at an angle to the flow of material, whereas the partly threshed product collects in the delivery space 18 or for some part together with the seeds on the sieve 27. The seeds fall across the sieve 27 into the delivery space 19 and the further material on the sieve 27 is conveyed by the sieve into the delivery space 18. The arresters 29 and 30 of flexible material, disposed above the sieve 27, brake the speed of the seeds, so that the latter readily arrive at the sieve and pass into the space 19. From the rearmost delivery space 19 the worm conveyor 21, the elevator 24 and the auger 26 convey the threshed product, i.e. the seeds, into the tank 25. The product collected in the delivery space 18 is conveyed by the worm conveyor 20, the elevator 22 and the dividing auger 23 to the threshing mechanism, where it is again threshed. In the harvester thresher described above the ejecting device formed by the ejectors 7 and joining the threshing mechanism for throwing the material emanating from the threshing mechanism and the shaker so that the seeds are separated from the further crop parts by differences in weight or shape or both, forms part of the cleaning stage in the harvester.

The second form of harvester thresher shown in FIGS. 4 to 7 has a mowing platform 37 and a threshing mechanism that includes a threshing drum 39 rotatable about a shaft 38 extending transversely of the implement's operative direction of travel. The drum 39 cooperates with a threshing jacket 40 disposed beneath the threshing drum 39. Behind the threshing mechanism there is an ejecting conveyor 41 made up of two endless conveyor belts 42 and 43 lying one above the other and cooperating with each other. The conveyor belts 42 and 43 are passed around shafts 44 and 44a, and 45 and 45a, respectively extending transversely of the longitudinal center line of the harvester and journalled in the frame thereof, the belts extending away from the threshing mechanism in a substantially horizontal direction to the rear and the upper belt 43 being longer than the other belt 42. The width of the conveyor belts 42 and 43 corresponds with the width of the threshing mechanism and the belts are relatively disposed so that the adjacent runs of the two belts move closer to one another in the direction towards the rear of the thresher. The front end of the upper conveyor belt 43 is located near the threshing drum 39, whereas the front end of the lower conveyor belt 42 is disposed near the rear end of the threshing jacket 40.

At the rear of the harvester two delivery spaces 49 and 50 are provided one behind the other, these being shaped in the form of funnels. The foremost delivery space 49 has a wall 51 which can pivot about a shaft 52 extending transversely of the longitudinal center line of the harvester and located near the lower end of the wall, the wall being securable in various positions. The delivery spaces 49 and 50 contain a worm conveyor 53 and 54 respectively. The worm conveyor 53 of the foremost delivery space 49 joins elevator 55, the other end of which communicates with a dividing auger 56 which is located in front of the threshing mechanism. The worm conveyor 54 of the rearmost delivery space 50 joins a further elevator 57 which communicates at the other end with a dividing auger 58 which is disposed above a grain tank 59.

Beneath the threshing jacket 40 there is a trough-shaped delivery space 60 in which there is a worm conveyor 61.

The worm conveyor 61 terminates at one end at elevator 62, the other end of which communicates with a dividing auger 63. Behind the dividing auger 63 there is an ejecting conveyor 64 which consists of two endless belts 65 and 66 lying one above the other. The belts are passed around shafts 67 and 67a, and 68 and 68a, respectively. It will be seen from FIG. 6 that the upper belt 66 is shorter than the lower belt 65 and that the ejecting conveyor 64 is located above the threshing mechanism. The upper belt 66 is resiliently movable in the up-and-down direction. Thus, from FIGS. 4 and 7, it will be seen that the bearings for the rotary shafts 68 and 68a of the upper belt 66 are provided with extensions 46. The bearings are displaceable in slots (not shown) in the frame of the harvester. The extensions 46 are displaceable in supports 47 on the frame of the harvester. Between the supports 47 and the bearings the extensions are surrounded by a spring 48. Rotary shafts 45 and 45a are similarly resiliently movable in the up-and-down direction. The belts 65 and 66 of the second ejecting conveyor 64 are disposed at an angle to the belts 42 and 43 of the first ejecting conveyor 41, and again the adjacent runs of the belts move closer to one another in the direction towards the rear of the harvester. The space located behind the ejecting conveyor 64 communicates with the grain tank 59 (see FIG. 4) and near the grain tank there is, in the upper part of this space, a curved portion 69 by means of which ejected material is guided into the grain tank. Between the two ejecting conveyors 41 and 64, outside the frame of the combine harvester (see FIG. 6), a fan 70 is disposed so that it can cause a flow of air to pass along the front of the first ejecting conveyor 41.

The belts of the ejecting conveyors 41 and 64 are driven in the same manner, this being shown in FIG. 7 for the upper ejecting conveyor 64. The rearmost rotary shaft 68a of the upper conveyor belt 66 is provided with a sprocket 71 which is linked by a chain 72 to a sprocket 73 on a shaft 74 journalled in the frame of the harvester. The shaft 74 is provided with a sprocket 75 which is linked by means of a chain 76 to a sprocket 77 on a shaft 78 journalled in the frame. The shaft 78 is driven by means of a sprocket and a chain 79 by the engine of the combine harvester. It will be noted that this engine has a flue pipe 98 directed to the rear.

The shaft 74 has furthermore a gear wheel 80 which cooperates with a smaller gear wheel 81 on a shaft 82, journalled in the frame. The shaft 82 is provided with a sprocket 83 which is linked by a chain 84 to a sprocket 85 on the rearmost shaft 67 on the lowermost belt 65. By means of the gear wheels 80 and 81 the lowermost conveyor belt is driven at a higher speed than the upper conveyor belt. The driving gears of the conveyors include continuous speed-change members (not shown) as are conventional in the art. For example, a number of such devices are illustrated in the Engineers' Illustrated Thesaurus, by Herkimer, Wm. Penn Publishing Co. (1952), pages 180–184.

Figure 8:
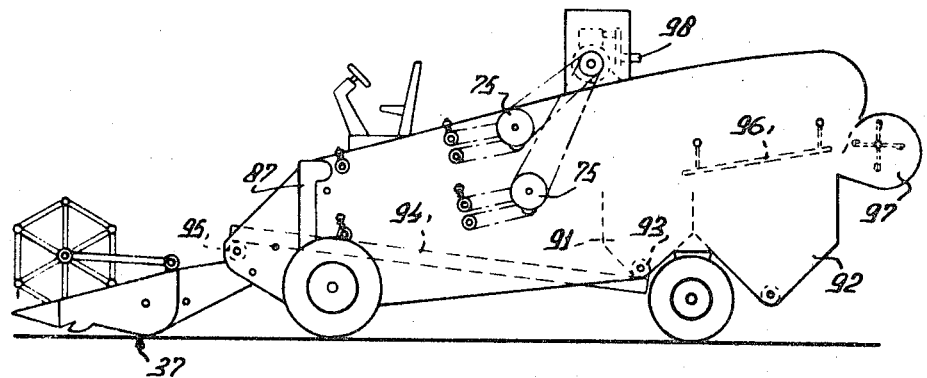
FIG. 8 is a diagrammatic side view of a third form of harvester thresher.
Figure 4:
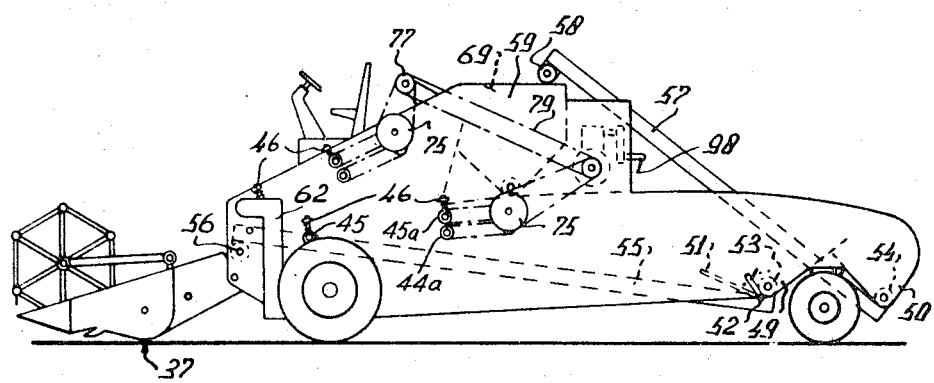
FIG. 4 is a diagrammatic side view of a second form of harvester thresher.
Figure 5:
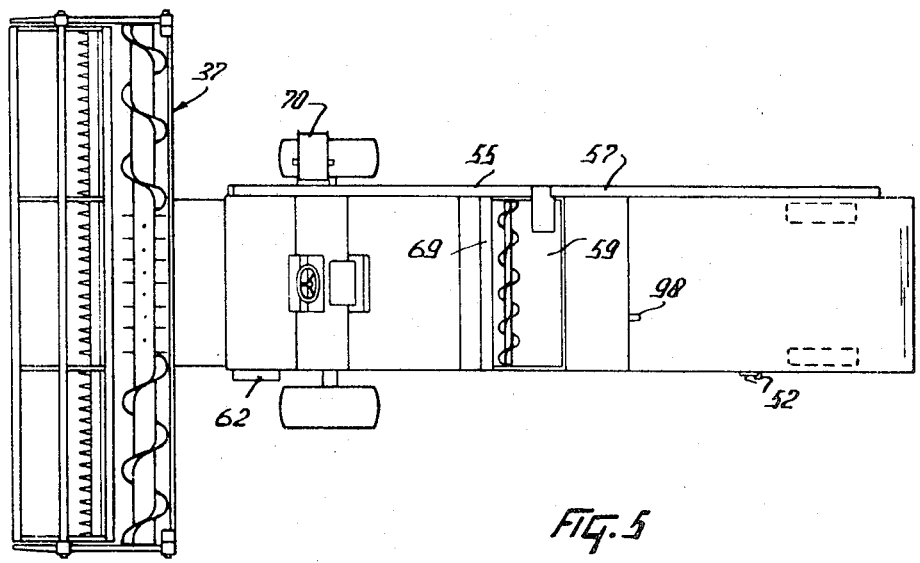
FIG. 5 is a plan view of the thresher of FIG. 4.
Figure 9:
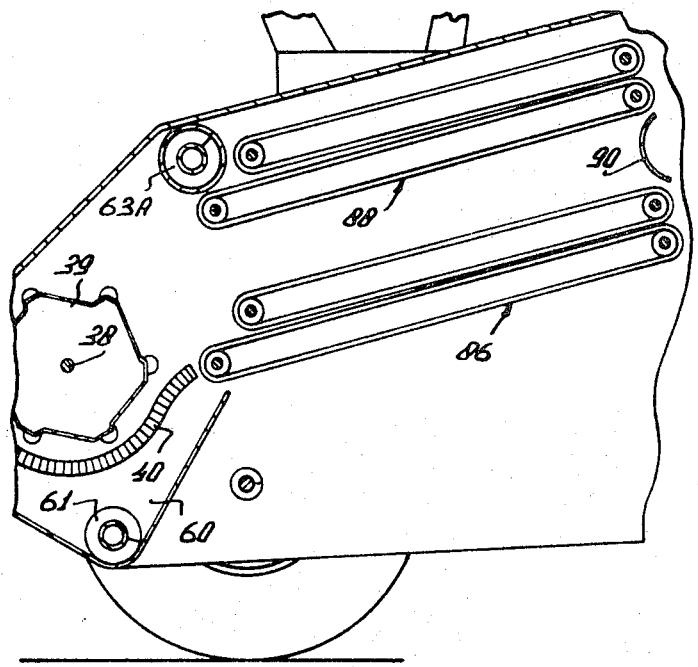
FIG. 9 is a sectional side view on an enlarged scale of threshing, separating and cleaning mechanism of the thresher of FIG. 8.

In the third form of harvester thresher shown in FIGS. 8 and 9 parts corresponding with those of the second form just described are designated by the same numerals. Behind the threshing mechanism there is disposed an ejecting conveyor, the construction and drive of which correspond with those of the ejecting conveyor 64 of the second form of harvester thresher. As in the second form a trough-shaped delivery space 60 is disposed beneath the threshing jacket 40 and accommodates a worm conveyor 61 which communicates with an elevator 87 the other end of which communicates with a dividing auger 63A which opens out at the front of a second ejecting conveyor 88 the construction and drive of which also correspond completely with those of the ejecting conveyor 64 described above. It will be apparent from the figures that the two ejecting conveyors 86 and 88 are loated directly one above the other and parallel to each other. A curved screen 90 is disposed between the ejecting conveyors 86 and 88. As in the second form two delivery spaces 91 and 92 are located one behind the other at the rear of the harvester. The foremost delivery space 91 contains a worm conveyor 93, which opens out at an elevator 94 which communicates with a dividing auger 95 which is located in front of the threshing mechanism. The rearmost delivery space 92 of this form constitutes the grain tank. Above the space 92 a sieve 96 is mounted for performing reciprocatory movements and is disposed so that it slopes towards the foremost delivery space 91. At the rear of the harvester a fan housing 97 has an opening beneath the sieve 96, the fan in the housing 97 being arranged to produce a flow of air passing through the sieve in a direction opposite the direction in which material is thrown out by the two ejecting conveyors 86 and 88. The engine provided for driving the harvester thresher shown in FIGS. 8 and 9 has a flue pipe 98 which pipe is directed to the rear.

Figure 10:
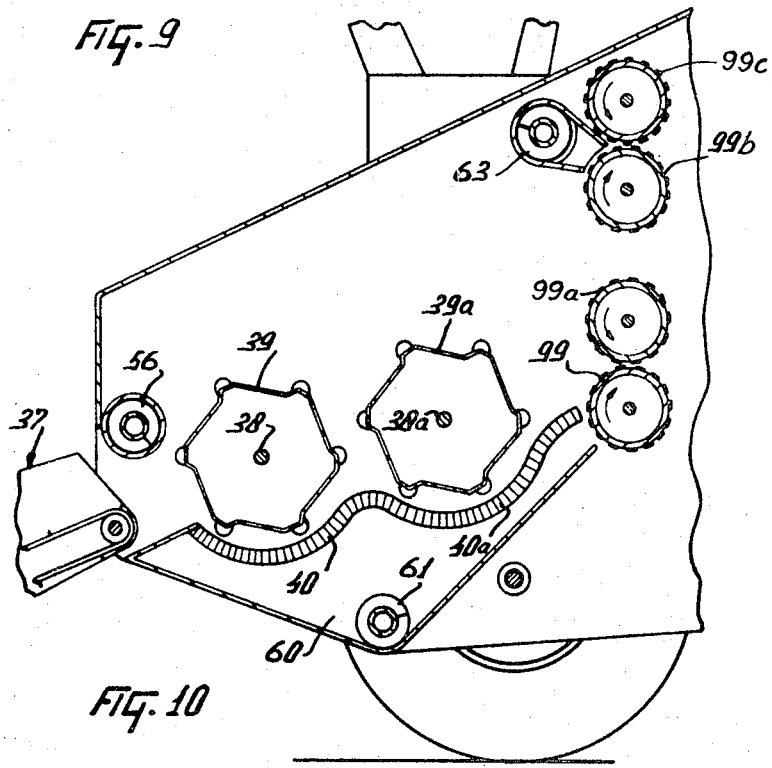
FIG. 10 is a sectional side view on an enlarged scale of an alternative form of threshing, separating and cleaning mechanism that can be included in the thresher of FIG. 8.

In the modified form of FIG. 10 the harvester thresher has two threshing drums 39 and 39a rotatable about shafts 38 and 38a respectively and associated threshing jackets 40 and 40a, disposed one behind the other, instead of one threshing drum 39 and jacket 40. The ejecting conveyors of the ejecting mechanism are replaced by ejecting rollers 99, and 99a, disposed one above the other and having, in operation, the directions of rotation indicated by arrows in FIG. 10. Crop passing between drum 39 and jacket 40 is thrown to the succeeding drum 39a and jacket 40a. Threshed product with some incompletely threshed product falls, however, through the jacket 40. Crop passing between drum 39a and jacket 40a is thrown to ejecting rollers 99 and 99a from whence it is thrown towards delivery spaces 91 and 92 as previously described. Product falling through jackets 40 and 40a into delivery space 60 is conveyed via worm conveyor 61, elevator 87 to a dividing auger 63, and finally to ejecting rollers 99b and 99c which throw the product in the direction of delivery spaces 91 and 92. For material so thrown, the separator of the seeds from the further crop parts is performed in the same manner as previously described.

In the second form thresher harvester or combine harvester shown in FIGS. 4 to 7, as in the first form, the crop is conveyed, during harvesting, from the mowing platform 37 towards the threshing mechanism. The material emanating from the threshing mechanism is thrown between the endless conveyor belts of the ejecting conveyor 41, arranged behind the threshing mechanism. As previously stated, the belts are driven so that the speed of the lowermost conveyor belt of the ejecting conveyor exceeds the speed of the upper conveyor belt. The material emanating from the threshing mechanism is conveyed with the same speed or with higher speed between the two conveyor belts of the ejecting conveyor 41 and at the end thereof it is thrown to the rear towards the delivery spaces at the rear of the thresher. The separation of the seeds from the further crop parts is performed in the same manner as described with reference to the first form of thresher. The foremost wall 51 of the delivery space 49, which collects unthreshed or partially threshed products, can be moved about the shaft 52, into various positions so that the distance between this delivery space and the ejecting mechanism can be varied in accordance with the type of crop to be worked. As in the first form the material collected in the delivery space 49 for unthreshed or partially threshed products can be conveyed from this space back to the threshing mechanism. The seeds collected in the rearmost delivery space 50 can be conveyed into the tank by means of the worm conveyor 54, the elevator 57 and the dividing auger 58, disposed above the grain tank. The straw and the chaff drops out of the harvester in front of the delivery spaces 49 and 50.

The material falling out of the threshing jacket 40, which material is threshed, unthreshed or partially threshed material and tailings, is collected in the funnel-shaped space 60 beneath the threshing jacket 40 and from there it can be conveyed by means of the worm conveyor 61, the elevator 62 and the dividing auger 63 in between the conveyor belts of the second ejecting conveyor 64. The material moving between these belts is thrown in the direction towards the grain tank 59 and the last residues of chaff and tailings are separated from the seeds, which are conveyed by the curved portion 69 into the grain tank 59. The chaff and tailings falling down are conducted by the upper run of the upper belt of the first ejecting conveyor 41 towards the threshing mechanism. By means of the fan 70 a flow of air is passed immediately behind the threshing mechanism across the front of the ejecting conveyor 41 so that the chaff and tailings conducted back by the upper belt of the conveyor are blown away.

In the third form shown in FIGS. 8 and 9 the operation of the thresher or combine harvester in separating the seeds from the further crop parts is similar to that of the second form. However, in this form no separate grain tank is provided on top of the thresher, instead the rearmost delivery space for threshed product is enlarged so as to form a grain tank. The ejecting conveyors 86 and 88 of this form are located parallel to each other and one directly above the other. The two ejecting conveyors 86 and 88 throw the material in the same direction and the unthreshed or partially threshed product is collected in the foremost delivery space 91, from where it can be fed back to the threshing mechanism. Chaff and tailings fall down during the movement out of the thresher.

The sieve 96, disposed above the rearmost delivery space 92, and caused to perform, in known manner, a reciprocatory movement, slopes towards the foremost delivery space 91, so that the material left on this sieve pass into the delivery space 91 and can again be conducted away to the threshing mechanism. The fan in the housing 97 produces a flow of air in a direction opposite the direction in which the material is thrown out by the ejecting mechanism and contributes to a satisfactory separation of the seeds from the crop parts. The flow of air passes, in addition, through the sieve 96, so that the material left on the sieve is more readily thrown into the foremost delivery space 91.

In the modified form shown in FIG. 10 the material emanating from the threshing mechanism is thrown away by the rollers in the same manner as by the ejecting conveyors of the other forms of thresher described above. Furthermore separation and cleaning of the material is performed in the same way.

It will be noted that in the first form of thresher described above the cleaning mechanism is formed by a set of sieves and a fan. In the other forms described both the separation and the cleaning are performed by the ejecting device and mechanism disposed at a distance therefrom for the separate delivery of at least one of the separated products.

Having thus described my invention, what I claim as new and desire to secure by Letters Patent of the United States is:

1. A combine harvester which comprises crop gathering means, thresher means adapted to receive cut crop from said crop gathering means and separate grain therefrom, a grain receptacle, first conveyor means for conveying grain separated by said thresher means to said grain receptacle, ejector means joining said thresher means receiving threshed crop comprising grain and other crop parts from said thresher means, said ejector means throwing said grain farther than said other crop parts, a first receiving means spaced a predetermined distance from said ejector means for receiving said other crop parts, second receiving means spaced a predetermined distance from said ejector means farther than said first receiving means for receiving grain thrown by said ejector, and second conveyor means for conveying said other crop parts from said first receiving means to said threshing means for further threshing.

2. In a combine harvester in accordance with claim 1, wherein said ejecting device comprises a pair of adjacent endless conveyor belts disposed one above the other and slanted upwardly to the rear, whereby material is ejected from said ejecting device to the rear and obliquely upwardly.

3. In a combine harvester in accordance with claim 2, wherein the lower of said belts rotates at a speed greater than the upper of said belts.

4. In a combine harvester in accordance with claim 1, wherein said ejecting device comprises a pair of adjacent rotating rollers, one disposed above the other.

5. A combine harvester in accordance with claim 1, wherein second receiving means comprises said grain receptacle.

6. A combine harvester in accordance with claim 1, wherein there is a third conveyor means for conveying grain received in said second receiving means to said grain receptacle.

7. A combine harvester in accordance with claim 1, wherein fan means is provided to move air between said ejector means and said first receiving means.

8. A combine harvester in acordance with claim 1, wherein fan means is provided to move air through the path of grain thrown by said ejector means.

9. A combine harvester in accordance with claim 1, wherein said ejector means is disposed beneath said thresher means.

10. A combine harvester in accordance with claim 1, wherein said ejector means comprises a rotating disc with blades extending therefrom.

11. A combine harvester in accordance with claim 10, wherein said disc is tilted in a forward direction whereby grain thrown to the rearward therefrom initially travels obliquely upwardly.

12. A combine harvester in accordance with claim 10, wherein said ejector means includes hopper means adapted to receive threshed crop from said thresher means and means to supply said threshed crop at a controlled maximum rate to said rotating disc with blades.

13. A combine harvester which comprises:
    threshing means;
    gathering and delivery means for gathering crop material from the field and delivering same to said threshing means;
    an ejecting device joining said threshing means throwing threshed crop which comprises grain and other crop parts received from said threshing means;
    first and second adjacent receiving means spaced from said threshing means, said first receiving means being spaced a first distance from said ejecting device receiving substantially only grain thrown therefrom, said second receiving means being spaced closer to said ejecting device than said first receiving means receiving crop parts comprising grain not fully separated by said threshing means from other crop material which are thrown from said ejecting device and fall short of said first receiving means; and
    conveying means from said second receiving means to said threshing means conveying crop parts in said second receiving means to said threshing means for further threshing.

14. A combine harvester in accordance with claim 13, wherein said ejecting device comprises a disc-type rotary member having blades disposed thereon, and an axis of rotation which is tiled forward relative to the vertical whereby material is ejected from said ejecting device to the rear and obliquely upwardly.

15. A combine harvester in accordance with claim 13, wherein said ejecting device comprises a pair of adjacent endless conveyor belts disposed one above the other and slanted upwardly to the rear whereby material is ejected from said ejecting device to the rear and obliquely upwardly, the lower of said belts rotating at a speed greater than the upper of said belts.

16. A combine harvester in accordance with claim 13, wherein fan means is included in said harvester which is adapted to move air through the path of said threshed crop thrown by said ejecting device.

17. A combine harvester in accordance with claim 13, including seed separation means adapted to receive a portion of said threshed crop directly from said threshing means, said separation means separating seed from other crop material and delivering said seed to said ejecting device.

References Cited

UNITED STATES PATENTS

| | | | |
|---|---|---|---|
| 551,499 | 12/1895 | Landis | 130—27 |
| 753,705 | 4/1904 | Hofmann | 130—23 |
| 757,307 | 4/1904 | Hill | 130—24 |
| 767,184 | 8/1904 | Thomson | 130—23 |
| 975,598 | 11/1910 | Ayler | 130—21 |
| 1,082,191 | 12/1913 | Georg | 130—21 |
| 1,864,772 | 6/1932 | Sprague | 130—21 |
| 1,917,536 | 7/1933 | McIntire | 130—24 |
| 2,145,330 | 1/1939 | Anderson | 130—21 |
| 2,314,901 | 3/1943 | Scranton | 130—27 |

ANTONIO F. GUIDA, Primary Examiner

U.S. Cl. X.R.

130—21, 24, 27